UNITED STATES PATENT OFFICE 2,494,583

PYROLYSIS OF C-ACETOXY ALIPHATIC AMIDES TO ACRYLAMIDES

William P. Ratchford, Philadelphia, and Charles H. Fisher, Abington, Pa., assignors to the United States of America as represented by the Secretary of Agriculture No Drawing. Application April 16, 1946, Serial No. 662,438

6 Claims. (Cl. 260—561)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention is related to the preparation and utilization of unsaturated amides, particularly acrylamides having the formula $$CH_2 : C(R)CONRR'$$

wherein R is hydrogen or alkyl and R' is alkyl.

Unsaturated amides previously have been made by various methods that have certain disadvantages. However, satisfactory methods for converting hydroxy amides into the corresponding unsaturated amides had not been known.

We have found that hydroxy amides may be transformed into useful unsaturated amides by acylation followed by thermal decomposition. We have found, moreover, that hydroxy amides may be acylated with various agents, including carboxylic acids, acid chlorides, acid anhydrides, ketene and certain esters. In addition, we have converted the unsaturated amides obtained by pyrolysis of acyloxy amides into useful polymers, copolymers, and other products.

The acrylamides polymerize readily by methods already known in the art. Mass polymerization, for example, was achieved by allowing the acrylamides containing small quantities of benzoyl peroxide to stand at room temperature for several days. Mass polymerization occurred more rapidly at 60° to 80° C. A convenient method of polymerizing the lower acrylamides comprises heating an aqueous solution containing approximately 5 percent to 40 percent of the amide and a small quantity of ammonium persulfate at about 60° to 90° C. Other solvents and catalysts may be used for the polymerization. The acrylamides copolymerize readily with acrylic esters, methacrylic esters, styrene, and other unsaturated monomers of the vinyl type.

Our invention is illustrated, but not limited, by the following examples:

Example I.—(N,N-dimethyllactamide)

A mixture of 1.5 moles methyl lactate, 1.5 moles dimethylamine, and 5 drops concentrated sulfuric acid was allowed to stand in a closed bottle at room temperature for 3 weeks. The sulfuric acid was neutralized with sodium acetate, and the resulting mixture was distilled. The yield of amide (B. P. 56° to 57° (0.6 mm.); $d_4^{20}$, 1.0508; $n_D^{20}$, 1.4588) was 86 per cent. Anal. calcd. for $C_5H_{11}O_2N$: N, 11.96; $M_D^{20}$, 30.77. Found: N, 11.77; $M_D^{20}$, 30.47.

In subsequent preparations in which sulfuric acid was not used, yields of 89 percent and 83 percent, respectively, were obtained by allowing the methyl lactate-dimethylamine mixture to stand at room temperature for three weeks and at about 30° for 24 hours.

Example II.—N,N-(dimethyl-alpha-acetoxypropionamide)

The dimethyllactamide (2.4 moles) 10 percent excess acetic anhydride, and 0.3 ml. concentrated sulfuric acid were mixed, and then heated on a steam bath; the temperature (exothermic reaction) went to 140°. The sulfuric acid was neutralized with anhydrous sodium acetate, and the mixture was distilled (97 percent yield; B. P. 67.5° (0.3 mm.); $d_4^{20}$, 1.0681; $n_D^{20}$, 1.4530. The distillate solidified (M. P., 44–6°). Anal. calcd. for $C_7H_{13}O_3N$: N, 8.80; saponification equiv., 159.2; $M_D^{20}$, 40.13. Found: N, 8.81; saponification equiv., 159.8; $M_D^{20}$, 40.21.

Example III

A mixture of 1 mole dimethyllactamide, 4 moles acetic acid, 200 ml. benzene, and 0.5 ml. concd. sulfuric acid was refluxed 27 hours, 10 g. aqueous layer (containing 5 g. $H_2O$) being obtained in the Dean and Stark tube. The catalyst was neutralized with sodium acetate. Upon distillation, the mixture yielded 0.74 mole unreacted hydroxy amide and 0.12 mole (48 percent yield) acetoxy amide.

Example IV

To 1 mole N,N-dimethyllactamide containing 1 g. KCN was added slowly (heating and stirring) 1 mole vinyl acetate. When about one-half of the vinyl acetate had been added the mixture warmed spontaneously, requiring cooling. At the end of the addition of vinyl acetate, the mixture was heated to 65° and allowed to stand overnight. The mixture was distilled, giving 0.47 mole unreacted amide and 0.50 mole acetoxyamide (94 percent yield).

Example V

Ketene prepared by pyrolyzing acetone in a ketene lamp was passed through 1 mole of dimethyllactamide at room temperature for approximately 12 hours. Upon distillation, 0.28 mole unreacted amide and 0.55 mole (76 percent yield) acetoxy amide were obtained.

Example VI

The acetoxy amides were pyrolized by passage through a vertical Pyrex-glass tube (approximately 1 inch in diameter) heated over a length of approximately 15 inches. The acetoxy amides were pumped into the top of the tube, and the products were collected in a cooled receiver at the bottom of the pyrolysis tube. A small quantity of polymerization inhibitor (usually hydroquinone) was added to the condensate, and the resulting mixture was then distilled to recover the acrylamide. Data obtained by pyrolizing N,N-dimethyl-alpha-acetoxypropionamide are given below in the table.

Table.—Pyrolysis of N,N-dimethyl-alpha-acetoxypropionamide

| Expt. No. | Gms. pyrolyzed | Temp. °C. | Contact time, secs.[1] | Pyrolysis rate, moles/hr. | Yield, percent of theoretical [2] | | |
|---|---|---|---|---|---|---|---|
| | | | | | Alkyl acrylamide[3] | Acetic acid | |
| | | | | | | Titration | Distillation |
| 341 | 104.8 | 500 | 2.9 | 0.507 | 99 | 93 | 60 |
| 342 | 138.8 | 559 | 1.9 | .536 | 107 | 92 | 57 |
| 347 | 133.3 | 557 | 2.4 | .514 | 104 | 89 | 57 |
| 348 | 334.2 | 532 | 2.9 | .504 | 113 | 101 | 66 |
| 349 | 293.7 | 532 | 3.8 | .385 | 118 | 98 | 56 |
| 354 | 235 | 523 | 2.6 | .504 | 120 | 101 | 67 |
| 356C | 769 | 521 | 3.0 | .452 | 107 | 99.5 | 57 |
| 366C | 2,616 | 520 | 2.7 | .514 | 108.5 | 98 | 61.5 |

[1] Based on the free space in the pyrolysis tube within 15° of the stated pyrolysis temperature.
[2] On the basis of unrecovered acetoxy amide.
[3] Not corrected for acetic acid (approximately 15% by weight); corrected yields were 82 to 98%.

The dimethylacrylamide fraction obtained by distillation of the pyrolyzates contained acetic acid. Although this fraction is useful for polymerization and other purposes, the acetic acid may be removed by treatment with sodium carbonate or other alkaline materials.

A satisfactory method of purifying the dimethylacrylamide comprised treating the acidic amide fraction with either excess anhydrous sodium carbonate or the theoretical quantity of 50 percent aqueous sodium hydroxide, filtering, and distilling the filtrate (in the presence of hydroquinone) under reduced pressure. The recovery of dimethylacrylamide (containing about 2 percent acid) after one such treatment was approximately 70 percent. Dimethylacrylamide obtained by the complete removal of acidic impurities followed by redistillation had properties (B. P. 73.5° to 73.4° at 16.5 mm.; $d_4^{20}$, 0.9651; $n_D^{20}$, 1.4732; $M_D^{20}$, 28.81; N, %: 14.25 (theoretical, 14.13 percent)), similar to those of the amide prepared from acrylyl chloride and dimethylamine.

Example VII 0.34 mole of N,N-diethyllactamide was prepared as follows: A mixture of polylactic acid, in amount equivalent to 1 mole of lactic acid, and the degree of polymerization of which was approximately 11, was refluxed with 1.1 mole diethylamine for 11 hours and heated in a sealed container on a steam bath for 32 hours. The mixture was then distilled. By allowing the distillation residue to react further with diethylamine, an additional quantity of N-diethyllactamide was obtained.

N,N-diethyllactamide was obtained also by passing polylactic acid and diethylamine countercurrently through a heated tower (packed with small porcelain Berl saddles). In different experiments the tower was kept at 125°, 170°, and 173° to 179° C.

The methyl ester of polylactic acid also yielded N,N-diethyllactamide when treated with diethylamine.

Example VIII

Treatment of N,N-diethyllactamide with acetic anhydride in the manner described above for N,N-diethyllactamide yielded N,N-diethyl-alpha-acetoxypropionamide.

Example IX

Acetoxypropionyl chloride (2.2 moles) was allowed to react with 2 moles diethylamine. N-diethylacetoxypropionamide was obtained in 66 percent yield by distillation of the reaction mixture. Anal.: Calc'd for $C_9H_{17}O_3N$: Saponification equiv., 187.2. Found: Saponification equiv. 187.7.

Pyrolysis of N,N-diethyl-alpha-acetoxypropionamide by the method described in Example VI, yielded N,N-diethylacrylamide in good yield.

Example X.—Preparation and pyrolysis of N-methyl-alpha-acetoxyisobutyramine

A mixture of 2 moles methyl alpha-hydroxyisobutyrate, 2 moles methylamine, and 0.2 ml. concentrated sulfuric acid was allowed to stand at room temperature for 2 months. The sulfuric acid was neutralized with anhydrous sodium acetate, and the mixture was distilled (yield, 97 percent; B. P. 118° to 120° at 0.2 mm.).

The hydroxy amide was acetylated with 10 percent excess acetic anhydride, using concentrated sulfuric acid as catalyst. After the catalyst was neutralized and the acetic acid distilled, the acetoxy-amide was collected at 118°/0.3; $n_D^{20}$, 1.4535. The yield was 50 percent, with formation of viscous, tacky fractions.

N-methylacetoxyisobutyramide (95 g. in 81 g. benzene) was pyrolyzed at 476° at the rate of 0.842 mole per hour (contact time, 1.23 sec.). Distillation of the pyrolyzate yielded N-methylmethacrylamide.

Example XI.—Preparation and pyrolysis of N,N-dimethyl-alpha-acetoxyisobutyramine Using methods described above, N,N-dimethylmethacrylamide was prepared. Treatment of alpha-acetoxyisobutyryl chloride with dimethylamine yielded N,N-dimethyl-alpha-acetoxyisobutyramide. A sample (70.9 g.) of this amide dissolved in 81 g. benzene was pyrolyzed at 480° C. (contact time, 1.7 seconds). Upon distillation of the pyrolyzate, N,N-dimethylmethacrylamide was obtained in high yield.

*Example XII*

To 3.5 g. of N,N-dimethylacrylamide was added 0.018 g. benzoyl peroxide. After the mixture was exposed to sunlight, the acrylamide polymerized to a colorless transparent resin. In a similar way, resins were prepared from N,N-diethylacrylamide.

*Example XIII*

To a 10 per cent aqueous solution of N,N-dimethylacrylamide was added 0.5 percent (by weight of monomer) of ammonium persulfate. The solution was heated gently. At 70° C. polymerization took place, forming a viscous solution.

When a 20 percent aqueous solution of N,N-dimethylacrylamide was polymerized under the same conditions, the resulting polymer gelled.

Using a similar technique, N,N-diethylacrylamide was polymerized in aqueous solution. This polymer, it was found, was less soluble in hot water than in cold.

*Example XIV*

Three ml. of N,N-dimethylacrylamide was mixed with 3 ml. of methyl acrylate and 0.01 benzoyl peroxide added. When the solution was warmed it polymerized vigorously, giving a resin.

In a similar manner were prepared interpolymers of other acrylamides with acrylic esters.

Although not specifically mentioned in the above examples, the following transformations fall within the scope of our invention:

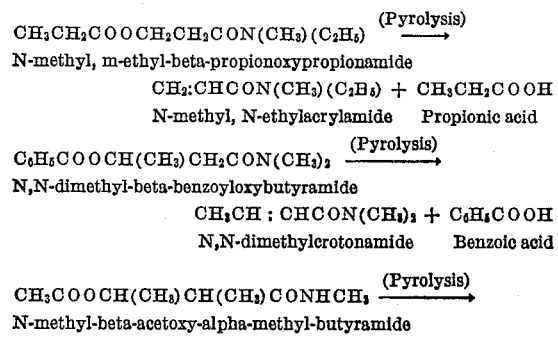

Having thus described our invention, we claim:

1. The process of preparing N,N-dimethylacrylamide, which comprises thermally decomposing N,N-dimethyl-alpha-acetoxypropionamide to remove the acetoxy group and a hydrogen atom on the carbon atom adjoining the carbon atom to which the acetoxy group is attached at about 476° to 559° C.

2. The process of preparing N,N-diethylacrylamide, which comprises thermally decomposing N,N-diethyl-alpha-acetoxypropionamide to remove the acetoxy group and a hydrogen atom on the carbon atom adjoining the carbon atom to which the acetoxy group is attached at about 476° to 559° C.

3. The process of preparing N-methyl-methacrylamide of the formula $$CH_2 : C(CH_3)CONH(CH_3)$$

which comprises thermally decomposing N-methyl-alpha-acetoxyisobutyramide to remove the acetoxy group and a hydrogen atom on the carbon atom adjoining the carbon atom to which the acetoxy group is attached at about 476° to 559° C.

4. The process of preparing an N-lower alkyl amide of an alpha-beta unsaturated aliphatic carboxylic acid comprising pyrolyzing an N-lower alkyl amide of a C-alkanoyloxy lower fatty acid having more than two carbon atoms, the alkanoyloxy group being in one of the positions alpha and beta, the other of the positions alpha and beta having a hydrogen atom, the C-alkanoyloxy group being a lower

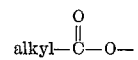

group, the N-lower alkyl radical being taken from the group consisting of

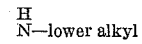

and N-(lower-alkyl)₂, at about 476° to about 559° C.

5. The process of preparing an N-di-lower alkyl amide of acrylic acid comprising pyrolyzing an N-di-lower alkyl amide of alpha-acetoxy propionic acid at about 476° to 559° C.

6. The process of preparing an HN-lower alkyl amide of methacrylic acid comprising pyrolyzing an HN-lower alkyl amide of alpha-acetoxyisobutyric acid at about 476° to 559° C.

WILLIAM P. RATCHFORD.
CHARLES H. FISHER.

REFERENCES CITED

The following references are of record in the file of this patent:

UNITED STATES PATENTS

| Number | Name | Date |
|---|---|---|
| 1,986,854 | Reid | Jan. 8, 1935 |
| 2,183,357 | Ritchie et al. | Dec. 12, 1939 |
| 2,208,328 | Lichty | July 16, 1940 |
| 2,231,905 | Hanford et al. | Feb. 18, 1941 |
| 2,265,814 | Ritchie et al. | Dec. 9, 1941 |
| 2,288,197 | Kranzlein et al. | June 30, 1942 |
| 2,301,131 | Lichty | Nov. 3, 1942 |
| 2,311,548 | Jacobson | Feb. 16, 1943 |
| 2,320,089 | Lichty | May 25, 1943 |
| 2,375,005 | Kung | May 1, 1945 |
| 2,401,885 | Semon | June 11, 1946 |